A. H. PLEASANTS.
COMBINED FAN AND MAP GUIDE.
APPLICATION FILED APR. 1, 1913.
1,148,479.
Patented July 27, 1915.
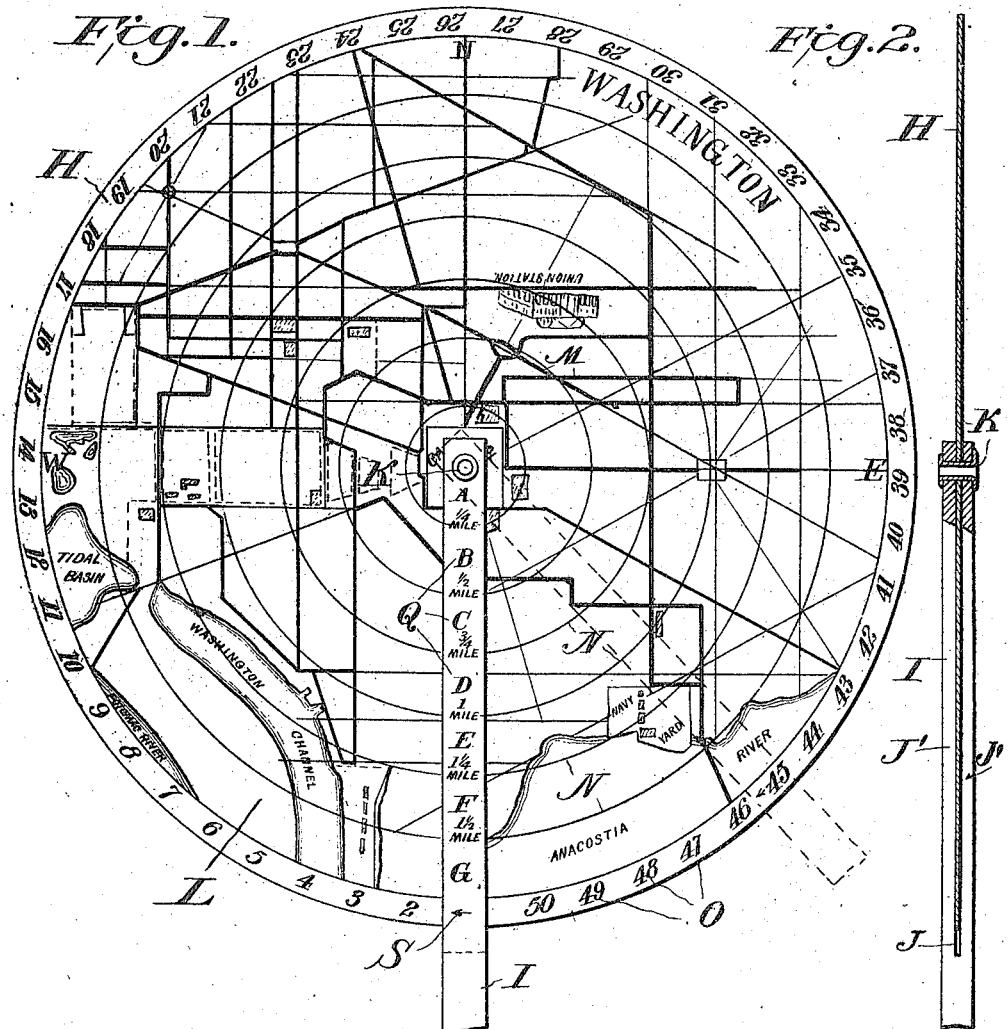
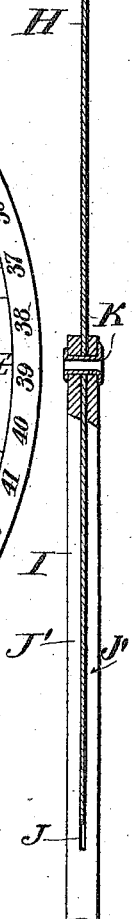
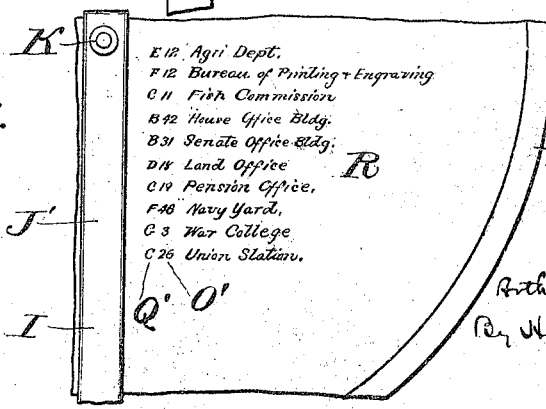
WITNESSES
INVENTOR

UNITED STATES PATENT OFFICE.

ARTHUR H. PLEASANTS, OF BALTIMORE, MARYLAND, ASSIGNOR TO THE EASY GUIDE MANUFACTURING COMPANY, A CORPORATION OF MARYLAND.

COMBINED FAN AND MAP-GUIDE.

1,148,479.  Specification of Letters Patent.  Patented July 27, 1915.

Application filed April 1, 1913. Serial No. 758,252.

*To all whom it may concern:*

Be it known that I, ARTHUR H. PLEASANTS, a citizen of the United States, residing at Baltimore, in the State of Maryland, have invented new and useful Improvements in Combined Fans and Map-Guides, of which the following is a specification.

This invention relates to a combined fan and map guide.

One of the objects of the invention is to provide a simple guide or indicator, convenient in form, by means of which any point of interest, or of public importance, or the like, may be readily and accurately located upon a map or chart.

A further object is to provide a device of this character by which the shortest route from a given central point to any other point may be readily determined.

A further object is to provide a guide or indicator which may be readily changed or adjusted at will to successively indicate the location of various points on the map or chart.

A further object is to combine a fan and a handle so that the former may rotate in the latter, said fan and handle being provided with coöperating indicating characters by means of which predetermined points on a map or chart printed on one face of the fan, may be accurately located.

The invention will be hereinafter fully set forth and particularly pointed out in the claim.

In the accompanying drawings:—Figure 1 is a front view illustrating a fan embodying my invention. Fig. 2 is a sectional view thereof. Fig. 3 is a fragmentary view of a portion of the rear face of the fan.

Referring to the drawing, H designates a fan body, preferably circular in shape, made of any suitable or preferred material. The handle I is bifurcated at J, the body H of the fan being mounted to rotate between the arms J'. Said body H is rotatably secured to the handle I in any suitable or preferred manner, such as the eyelet K, the latter providing a simple and efficient means for so uniting the parts that the fan body is free to rotate. On the front face of the fan is printed, lithographed, or otherwise applied, a map or chart L, a portion of the map of the city of Washington being illustrated in the drawing. It will be noted that the map contains all of the points that are usually of interest to sightseers, together with all the street railways, the latter being indicated by the heavy black lines M. It will be noted that the map is provided with a plurality of concentric lines N, said lines being used to indicate distances from the central point, the distance indicated by the space between any two contiguous lines being one half mile in the form illustrated. The circumference of the map is also provided with a border containing numbers or other characters indicated by O. The arm J' of the handle is divided off into spaces corresponding with the spaces between the lines N, each space being designated by a letter or character Q. Said arm J' is also provided with an arrow or other indicating character, located above the characters O. On the back of the fan body is printed a list of the various points of interest, said list being indicated at R, Fig. 3, and in alinement with each name or location are two characters Q' and O' corresponding to the characters Q and O, respectively on the front face of the fan and on arm J'.

In operation, the Capitol is the central point, and when the operator desires to locate any other point he first consults the list R on the back of the fan. Assume for instance that he is at the Capitol and desires to go to the navy yard. He consults list R and finds the navy yard marked F 46. Turning the fan over, the body H is rotated until the arrow S points to the number 46 of the series of characters O and then by locating the letter F in one of the spaces Q on arm J', it will be found that the navy yard is located just to the left of the handle opposite said letter F. It is obvious that any other point included in the list R may be readily and quickly located in a similar manner.

Having thus explained the nature of my invention and described an operative manner of constructing and using the same, although without attempting to set forth all of the forms in which it may be made, or all of the forms of its use, what I claim is:—

A combined fan and map guide comprising a circular body having one face provided with a map or chart surrounded by circumferential locating characters, said map having a plurality of concentric zone rings, a handle to which said map or chart is rotatably connected, said handle being provided with graduations coincident with said zone rings and provided with zone locating characters, and an index of predetermined combinations of said circumferential and zone locating characters, whereby when said handle is brought over a predetermined circumferential character the zone character of said combination on said handle will be opposite the point it is desired to locate on the map.

In testimony whereof I have hereunto set my hand in presence of two subscribing witnesses.

ARTHUR H. PLEASANTS.

Witnesses:
 MARY M. MAGRAW,
 AUGUST ROEDER, Jr.

Copies of this patent may be obtained for five cents each, by addressing the "Commissioner of Patents, Washington, D. C."